United States Patent [19]

Madigosky et al.

[11] 4,418,573
[45] Dec. 6, 1983

[54] METHOD FOR MEASURING MATERIAL CHARACTERISTICS

[75] Inventors: Walter M. Madigosky; Gilbert F. Lee, both of Silver Spring, Md.

[73] Assignee: The United States of America as represented by the Secretary of the Navy, Washington, D.C.

[21] Appl. No.: 392,813

[22] Filed: Aug. 28, 1982

[51] Int. Cl.³ ............................................. G01H 15/00
[52] U.S. Cl. ...................................... 73/574; 73/575; 73/584
[58] Field of Search .................. 73/574, 575, 602, 584

[56] References Cited

U.S. PATENT DOCUMENTS

| | | | |
|---|---|---|---|
| 2,695,517 | 11/1954 | Wiggins | 73/574 |
| 3,030,803 | 4/1962 | Painter . | |
| 3,319,460 | 5/1967 | Barigant | 73/575 |
| 3,323,352 | 6/1967 | Branson | 73/574 |
| 3,933,032 | 1/1976 | Tschoengl . | |

OTHER PUBLICATIONS

"Longitudinal Forced Vibration of Viscoelastic Waves with End Mass", Norris, Jr. and Chung, Special Report #135, U.S. Army Cold Regions Research and Engineering Lab., Hanover, N.H., Apr. 1970, Contract #DA-AMC-27-021-67-G21.

Primary Examiner—Howard A. Birmiel
Attorney, Agent, or Firm—R. F. Beers; K. E. Walden

[57] ABSTRACT

A fast and reliable method is disclosed for measuring the dynamic mechanical properties of a material, particularly its modulus of elasticity and loss factor. By this method the acoustic characteristics of a material can be determined. An elongate strip of material, whose properties are desired to be known, is provided with miniature accelerometers fixedly secured to its opposite ends. One end of the strip is excited by a random noise source which travels toward the other end where that end and accelerometer is allowed to move freely (unrestrained). The accelerometers measures the ratios of acceleration at two locations over an extended frequency range of 0.2 Hz to 25 KHz, and the information is processed through a fast fourier transform spectrum analyzer for determining amplitude of acceleration ratio and phase difference between the two accelerometers from which Young's modulus and loss factor for that material are determined.

1 Claim, 5 Drawing Figures

METHOD FOR MEASURING MATERIAL CHARACTERISTICS

BACKGROUND OF THE INVENTION

Various methods have been used to determine mechanical properties of elastic type materials. One of these methods employs a piezoelectric transducer connected to one end of an elongate test specimen with a needle lightly touching the surface of the elongate test specimen at some known distances from the transducer (vibration) input to measure amplitude and phase difference over that known distance. From the loss in amplitude and phase difference from the input to the output, the characteristics of the material can be determined. One approach, discussed in the article "Propagation of Audiofrequency Sound in High Polymers," by R. S. White, B. A. Mrowca and E. Guth, appears in the *Journal of Applied Physics*, Vol. 20; No. 6, pages 481–485 (June 1949). Another approach is discussed by the inventors in "Automated Dynamic Young's Modulus and Loss Factor Measurement," *Journal, Acoustics Society of America*, Vol. 66; No. 2, August 1979. This last article describes an advanced progressive wave initiating apparatus used in conjunction with an automated data processor. A phonograph cartridge is positioned on the surface of a test strip at selected distances from an electromagnetic shaker input. The length of the test strip must be sufficient to defeat the creation of a standing wave between the strip ends. Relative attenuation and phase shift are measured for each selected needle distance. Since the input frequency is known, propagation velocity in that particular material can be determined. The apparatus and method according to this approach is disclosed and claimed in our co-pending U.S. patent application entitled "Instrument for Measuring Dynamic Viscoelastic Properties" Ser. No. 172,585, filed July 28, 1980, now U.S. Pat. No. 4,352,292.

SUMMARY OF THE INVENTION

In the present invention there is provided a method for providing a fast and reliable resonance determination of material characteristics. Unlike progressive wave apparatus, the present invention is capable of characterizing a wide range of materials from soft polymers to rigid metals and stiff compositions. It is adapted to perform on relatively small (and short) test samples since it employs introduced standing waves between the sample ends, and it is not required to take readings at a plurality of longitudinally spaced apart location along the length of the sample as described in the prior art.

An elongate strip of test material, selected of a length to allow the generation of resonant standing waves, is provided with accelerometers secured at its opposite ends. One end of the material is excited by random noise, and data taken from both accelerometers is analyzed by a fast fourier transform (FFT) spectrum analyzer where the amplitude of acceleration ratio and phase difference between the two accelerometers are continuously monitored over a frequency range from about 0.2 Hz to 25 KHz. The computerized data analysis is performed only at resonant frequencies in the test material. The output is a family of Young's modulus and loss factor curves, each over a range of frequencies at a constant temperature.

OBJECTS OF THE INVENTION

It is therefore an object of the invention to provide a method of determining dynamic mechanical properties of a material.

It is another object of the invention to provide a method of determining Young's modulus and the loss factor of a material.

It is still another object of the invention to provide a method of determining the acoustic sound absorption properties of a material, such as a viscoelastic material.

It is yet another object of the invention to provide a method of setting up a standing wave between the ends of a length of an elongate strip of test material and continually comparing amplitude of acceleration ratios between opposite ends and phase difference between the ends at resonance (standing waves) for information useful in a formula for determining Young's modulus and loss factor for the material over wide frequency and temperature ranges.

It is a still further object of the invention to excite one end of an elongate test strip with random noise, and monitor the output from both ends with a fast fourier transform spectrum analyzer over a selected frequency range as an aid in determining material properties.

Other objects of the invention will become apparent from the following detailed description and method when considered in conjunction with the drawings.

DETAILED DESCRIPTION OF THE INVENTION

Recent developments in apparatus for determining mechanical properties of materials have been refined by employing computer automation. However, even with these developments, mechanical properties of "rubberlike" viscoelastic materials with a modulus ranging only between $5 \times 10^6$ and $5 \times 10^9$ dynes/cm$^2$ could be measured. Furthermore, it was required that a "long" test sample be used to completely absorb the input energy along its length and eliminate possibility of a standing wave.

Figure 1:
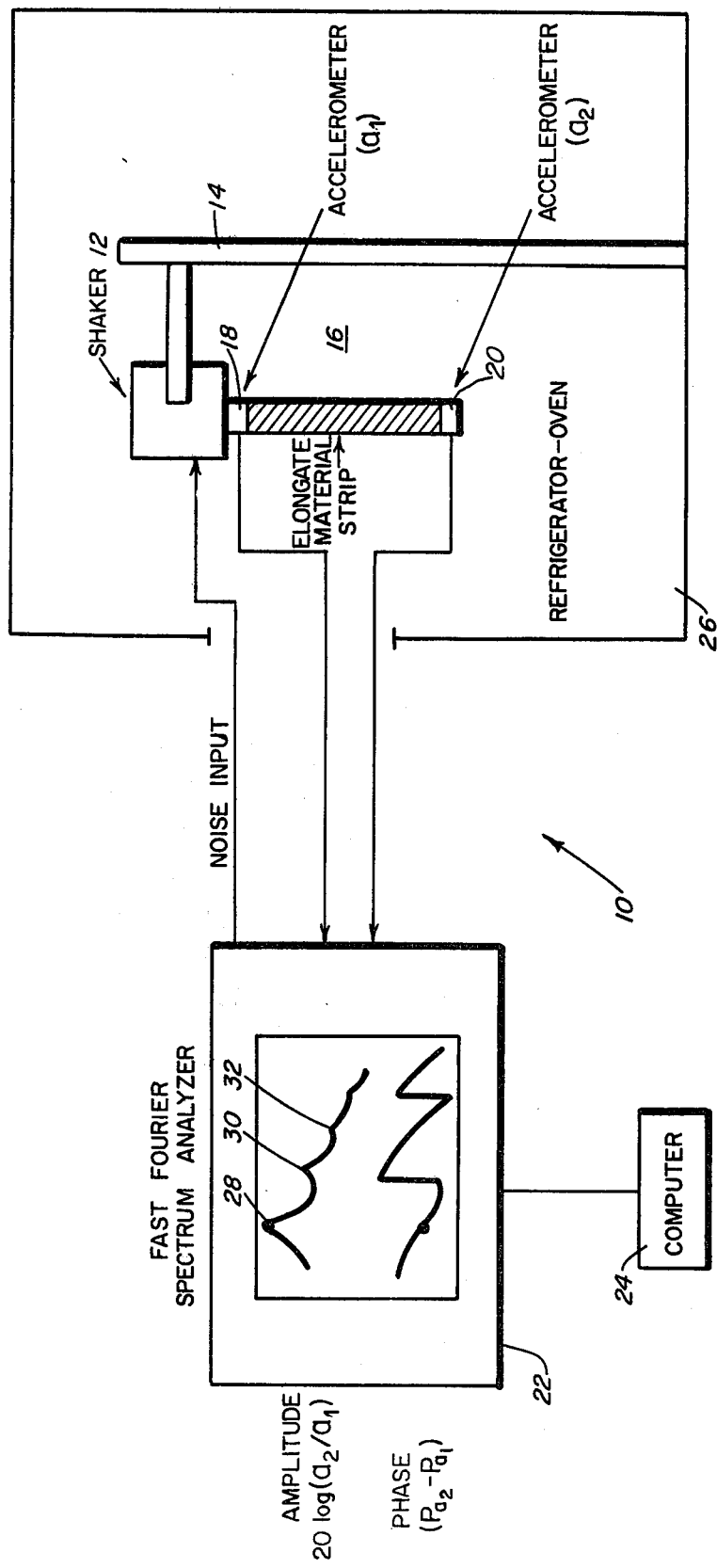
FIG. 1 is a schematic illustration of apparatus for carrying out a method for aiding determination of mechanical properties of a material.
Figure 2:
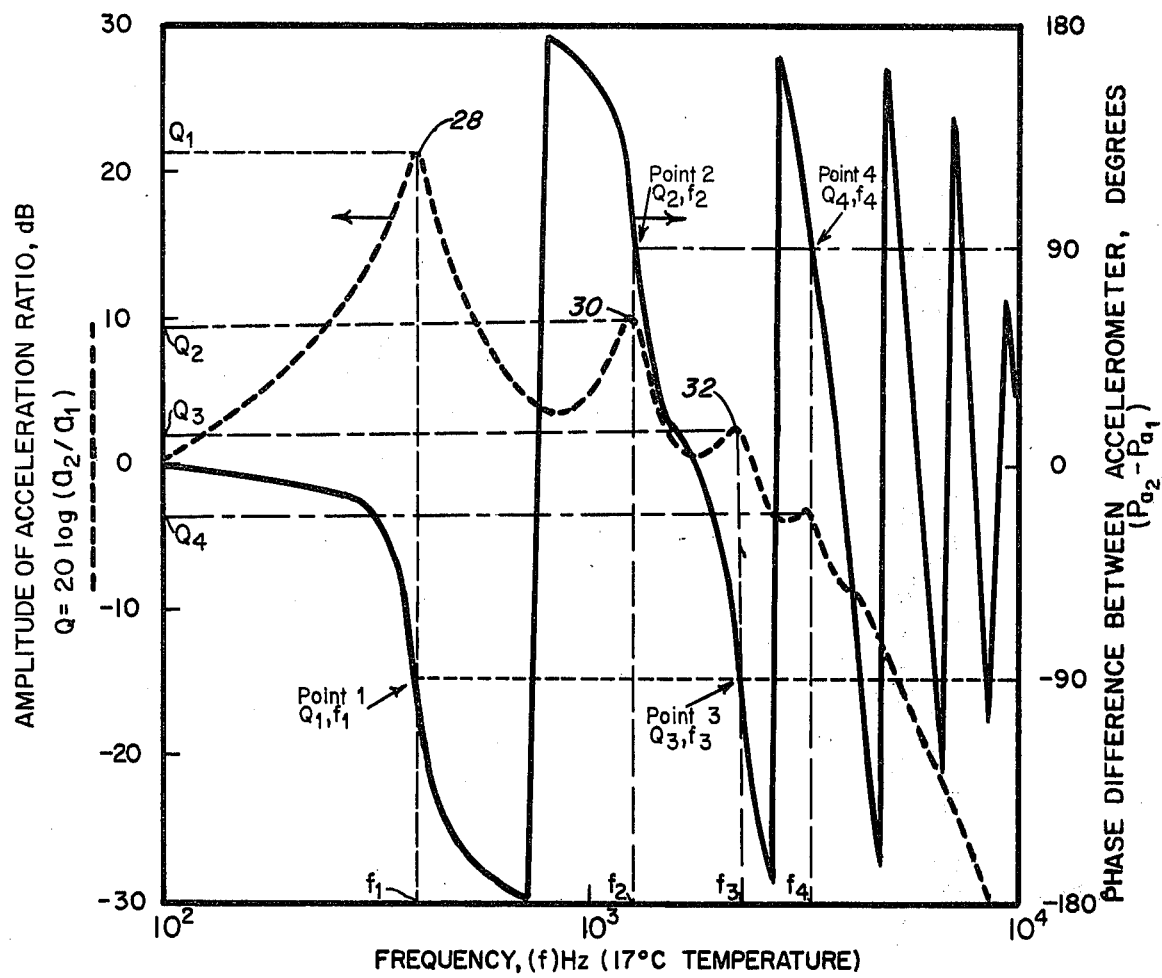
FIG. 2 is a graph illustrating amplitude of acceleration ratio and phase difference between two accelerometers in the test material plotted against shaker frequency at 17° C.

Referring now to FIG. 1, there is illustrated apparatus for carrying out the method of the invention disclosed herein. It employs introducing resonance into a material for measuring its mechanical properties. The test apparatus is illustrated schematically and is generally identified by the numeral 10. An electromagnetic shaker 12, such as a Bruel & Kjaer type 4810, fixedly secured and supported by standing structure 14, is used to drive an elongate test specimen 16 at one of its end while its other end is allowed to move freely. Miniature accelerometers 18 and 20, such as Bruel & Kjar type 8307, are securely mounted on opposite ends of the elongate test specimen to measure the driving acceleration of shaker 12 and acceleration at the free end of the specimen. Shaker 12 introduces random noise into one end of the test specimen. The output signals from the two accelerometers are processed by a dual channel fast fourier transform (FFT) spectrum analyzer 22, such as a Hewlitt Packard Spectrum Analyzer 3582A. The analyzer performs the following: (1) digitizes and displays the measured signals, as illustrated in FIG. 2, as the amplitude of acceleration ratio 20 log ($a_2/a_1$), where $a_1$ and $a_2$ are the amplitude of acceleration of accelerometers at the driven end and at the free end, respectively and the phase difference $P_{a2} - P_{a1}$ of the two accelerometers, and (2) provides a random noise source to initially drive shaker 12. The amplitude of acceleration ratio and phase difference of the two accelerometers are continuously measured by analyzer 22 over a frequency range of five decades (0.2 to 25,000 Hz). The acquisition of the data is further automated with a mini computer 24, such as a Hewlett Packard 9825A calculator. The calculator is programmed to initiate and control the frequency range and to collect and store data from the analyzer for later calculations. The computerized data analysis is performed only at resonant frequencies within an elongate test specimen 16, frequencies which establish standing waves between the ends of the test specimen. Typically, the length of the specimen is around 15 cm with transverse dimensions between 0.25 to 0.5 cm. The length of the specimen may, however, vary substantially, but must not be of a length which would completely absorb the input and prevent establishment of a resonant standing wave. Note that this is contrary to previous methods where it was desired to prevent a standing wave along the length of the test specimen.

The test apparatus in the immediate vicinity of test specimen 16 is mounted in a refrigerator-oven 26 where the environment for testing can be controlled over a temperature range from about $-50°$ to $100°$ C.

The output of spectrum analyzer 22 shows that at certain frequencies the amplitude of the acceleration ratio goes through local resonance peaks 28, 30, and 32, as indicated generally in FIG. 1 and illustrated in considerable more detail in FIG. 2. This is provided from the standing waves established at various frequencies in the test specimen. In general, a number of peaks, such as 28, 30, and 32, are observed. The lowest frequency, peak 28, is usually due to resonance of both the added mass of the accelerometers and the distributed mass of the sample. Higher frequency peaks, 30 and 32, are due to standing wave effects in which the length of the sample is an integral function of the input wavelength. This data (amplitude and frequency) is used to calculate Young's modulus and loss factor for the material under examination.

Figure 3:
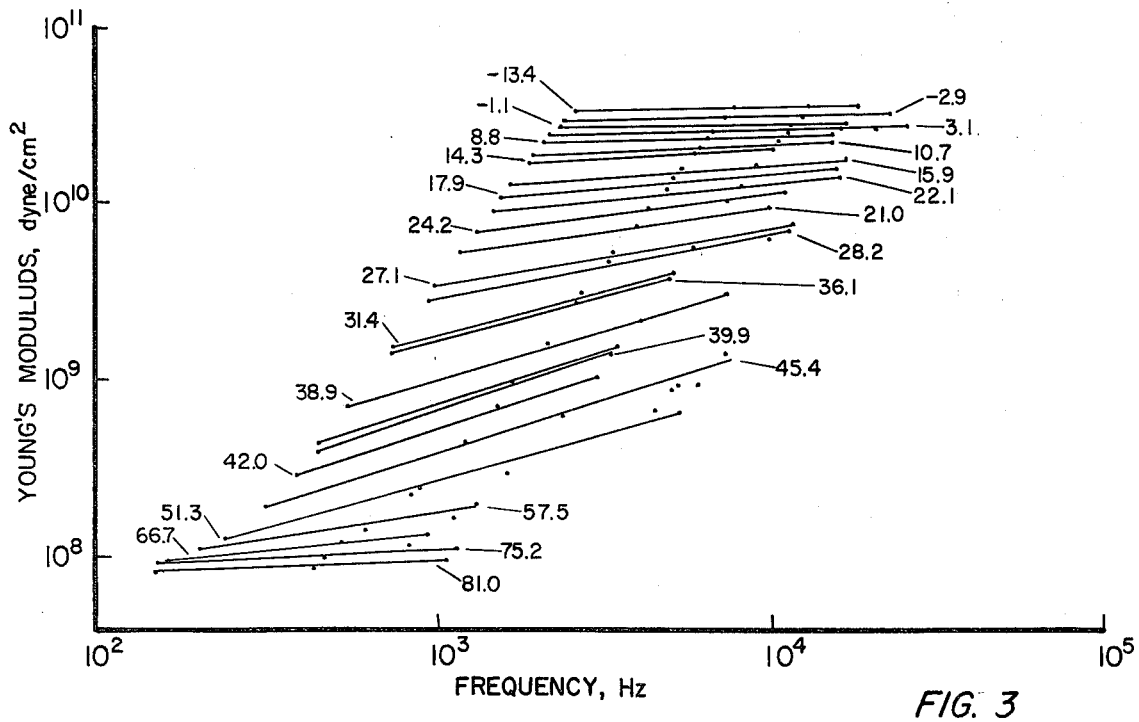
FIG. 3 is a graph representing a family of Young's modulus curves determined for the material from repeated measurements such as shown in FIG. 2 over a range of four resonant frequencies at various temperatures from −13.4° C. to 81° C.
Figure 4:
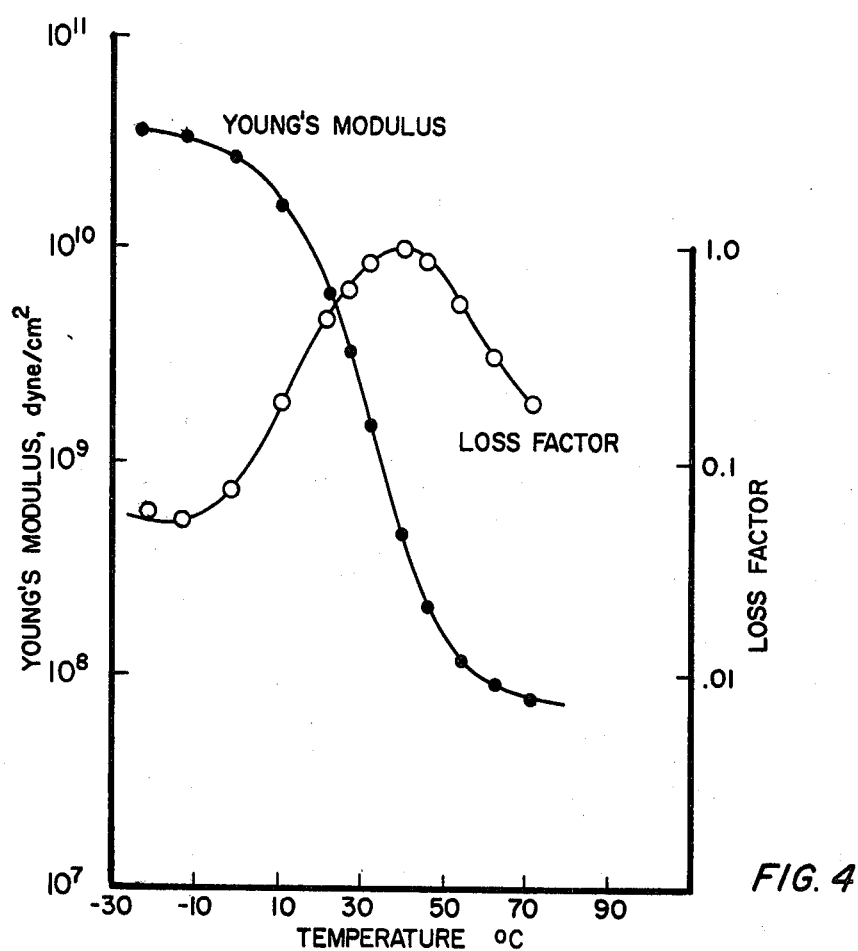
FIG. 4 is a graph illustrating Young's modulus and loss factor versus temperature for the material.
Figure 5:
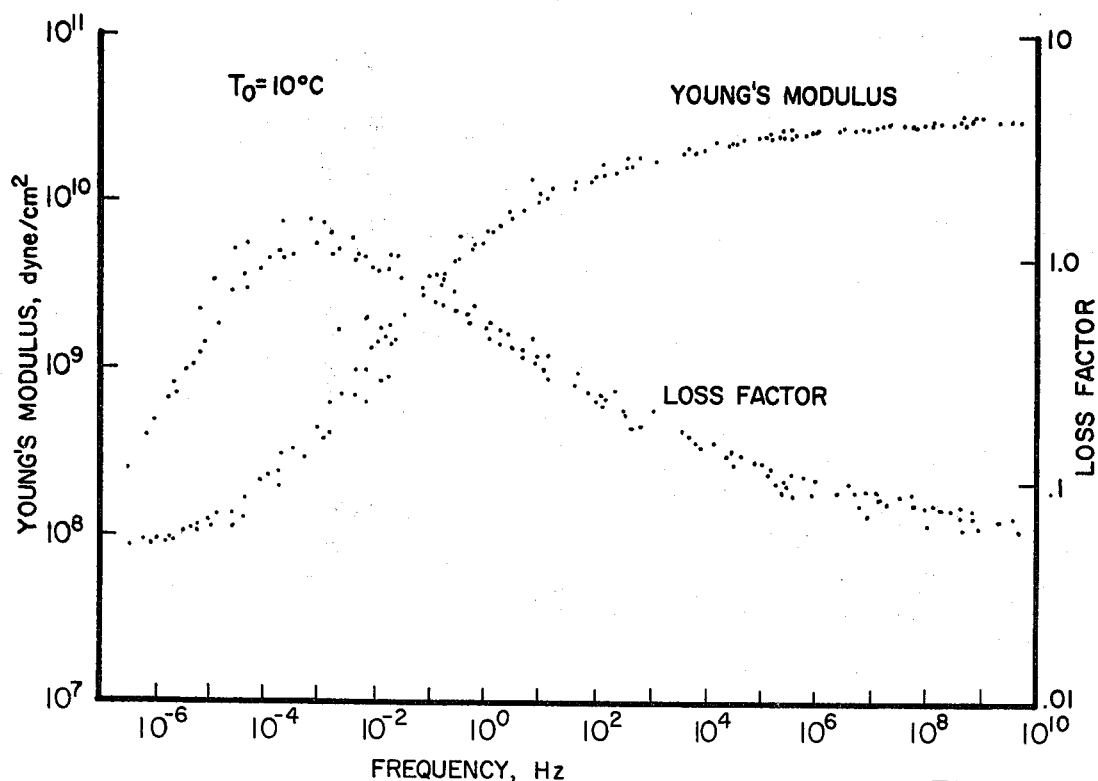
FIG. 5 is a graph illustrating Young's modulus and loss factor versus frequency for the material.

For viscoelastic materials, measurements may be made at several temperatures, typically between $-50°$ C. to $100°$ C., and a family of modulus and loss factor curves obtained over a range of frequencies at a selected temperatures, as illustrated in FIG. 3. The data is then processed in one of two ways: (1) as a temperature plot as illustrated in FIG. 4, or (2) as a frequency plot, as illustrated in FIG. 5. In a temperature plot, only the first resonant peaks are used, for example peak 28, and the data is plotted as a function of temperature. In a frequency plot, modulus and loss factor curves are mechanically shifted until they partially overlap in a well known procedure called time-temperature superposition. The final result is a constant temperature plot over a wider frequency range than actually measured.

Referring again to FIG. 2, two quantities may be measured from the curves at numerous points:

(a) Obtain values $Q_1$ and $f_1$ at point 1, $-90°$ phase difference
(b) Obtain values $Q_2$ and $f_2$ at point 2, $+90°$ phase difference
(c) Obtain values $Q_3$ and $f_3$ at point 3, $-90°$ phase difference
(d) Obtain values $Q_4$ and $f_4$ at point 4, $+90°$ phase difference.

A brief description follows with equations describing longitudinal vibrations induced into a viscoelastic bar to the ends of which accelerometers have been added.

When a bar or elongate member is given an oscillitorary longitudinal displacement $u_o = U_o \exp(i\omega t)$, where $U_o$ is the displacement at $x=o$ and $t=o$, the equation of motion is $$\frac{\partial \sigma}{\partial x^2} = \rho \frac{\partial^2}{\partial t^2}(u + u_o) \quad (1)$$

where x axis is along the length of the elongate material or bar, $\sigma$ is the uniaxial stress, $\rho$ is the mass density, and u is the axial displacement at any point in the bar. The ratio of stress to strain is the complex Young's modulus $E^*$ $$\sigma/\epsilon = E^* = E' + iE'' = E'(1+i\delta) = E \exp(i\theta) \quad (2)$$

where $E'$ and $E''$ are the real and imaginary parts of the Young's modulus and $\delta$ is the loss factor and $\theta$ is the phase lag between stress and strain. Using $\epsilon = \partial u/\partial x$ and expressing the time dependent displacement as $u = \bar{u} \exp(i\omega t)$ equation (1) becomes $$\frac{d^2\bar{u}}{dx^2} + k^2\bar{u} = -k^2 U_o \quad (3)$$

where the complex propagation constant is $k = \sqrt{\rho\omega^2/E^*}$ and the phase velocity is $c = \sqrt{E/\rho} \sec \theta/2$. The solution to equation (3) is $$u + U_o = C_1 \cos kx + C_2 \sin kx \quad (4)$$

where $C_1$ and $C_2$ are obtained from the boundary conditions $$u(o,t) = o$$

and $$A\sigma(L,t) = -m\frac{\partial^2}{\partial t^2}(u + u_o)_{x=L} \quad (5)$$

where A is the cross-sectional area of the bar, L is the length of the elongate material or bar, and m is the end mass. Applying the boundary conditions to equation (4), the displacement solution is $$\frac{\bar{u}(x,\omega)}{U_o} = \cos kx + \frac{\tan kL + \gamma}{1 - \gamma \tan kL} \sin kx - 1 \quad (6)$$

where $Y = m/LM$ and M is the mass of the bar. Using the definitions of k, Y, and c and equation (6), the ratio of bar end linear acceleration (or displacement) is expressed in the form of a real and imaginary part $$\frac{U_o}{\bar{u}(L,\omega) + U_o} = Re + iIm \quad (7)$$

where $$Re = \cos h(\xi \tan \theta/2)(\cos \xi - R\xi \sin \xi) + R\xi \tan \theta/2 \cos \xi \sin h(\xi \tan \theta/2) \quad (8)$$

$$Im = \sin h(\xi \tan \theta/2)(\sin \xi + \xi R \xi \cos \xi) + R\xi \tan \theta/2 \sin \xi \cos h(\xi \tan \theta/2) \quad (9)$$

where R is defined as the mass ratio, $m/\rho AL$, and $\xi = \omega L/c$, (or $c = \omega L/\xi = 2\pi f L/\xi$) where c = speed of sound in the material.

Equation 8 and 9 are solved for two quantities: $\xi$ and $\tan(\theta/2)$. There are four unknowns in equations 8 and 9: Re, Im, $\xi$, and $\theta$, and they cannot be obtained from only the two equations. However, when the frequency (f) is such that the phase angle difference between the acceleration of the driven end ($P_{a1}$) to the free end ($P_{a2}$) of the bar or elongate material (sample) is $\pm 90°$ out of phase, equations 8 and 9 become $$Re = 0 \quad (10)$$

$$Im = 1/Q \quad (11)$$

where Q is the measured amplitude of acceleration ratio at the 90° phase point (not at peak value). $Q = 20 \log (a_2/a_1)$ (dB).

Therefore, at the $\pm 90°$ phase differences (see FIG. 2) only $\xi$ and $\theta$ are unknown. Equation 8 may be stated as $$\cos h(\xi \tan \theta/2)(\cos \xi - R\xi \sin \xi) + R\xi \tan \theta/2 \cos \xi \sin h(\xi \tan \theta/2) = 0. \quad (12)$$

Equation 9 may be stated as $$\sin h(\xi \tan \theta/2)(\sin \xi + R\xi \cos \xi) + R\xi \tan \theta/2 \sin \xi \cos h(\xi \tan \theta/2) = 1/Q \quad (13)$$

where $\xi$ is related to the speed of sound (c) propagating through the sample and is calculated as $c = 2\pi f L/\xi$ where f is resonance frequency and L is the length of the sample. Therefore, it is possible to calculate the unknowns.

The real part of Young's modulus is calculated by the formula $$E' = \rho c^2 \cos^2(\theta/2) \cos \theta \quad (14)$$

where $\rho$ is the density of the material.

Then the loss factor ($\delta$) is calculated by the formula $$\tan \theta/2 = 2 \sin h^{-1}(1/Q_n)/\pi(2n-1) \quad (15)$$

where n is the mode number obtained from FIG. 2 and the specification where 1, 2, 3 and 4 are subscripts of Q and f. Then the loss factor is:

Loss factor $(\delta) = \tan \theta \quad (16)$ where $\theta$ is the phase lag between stress and strain.

EXAMPLE

As an illustration of the use of the apparatus, the Young's modulus and loss factor of a commercially available polyurethane (Witco Chemical Company, New Castle, Del., density = 1.16 g/cm$^3$, sample number 24-8-1) was determined. Typical amplitude and phase of the acceleration ratio, plotted against frequency at 17° C., are shown in FIG. 2. From this plot, Young's modulus and loss factor are determined. By repeating the measurements at different temperatures, a family of modulus and loss factor curves, each over a range of frequencies, were made. For example, a family of modulus curves are presented in FIG. 3. From this data, a temperature plot or a frequency plot can be made.

The modulus and loss factor versus temperature is shown in FIG. 4. From the peak of the loss factor curve, the glass transition temperature is 40° C. at approximately 400 Hz. Also, the modulus and loss factor can be plotted against frequency (master curve) as shown in FIG. 5. The data span approximately sixteen decades of shifted frequency.

As a demonstration of the use of the apparatus for materials that are not viscoelastic, the modulus of two metal matrix composite materials were determined. Modulus values of $1.63 \times 10^{12}$ and $9.93 \times 10^{11}$ dyne/cm$^2$ were obtained, respectively, for a unidirectional reinforced graphite aluminum (DWA Composite Specialities, Inc., Chatsworth, Calif. density = 2.49 g/cm$^3$) and a short fiber silicon carbide aluminum (Exxon Enterprises, Greer, S.C., density = 2.85 g/cm$^3$). These moduli are in excellent agreement with measurements determined by an ultrasonic method as one can see: $1.61 \times 10^{12}$ and $9.79 \times 10^{11}$ dyne/cm$^2$.

Based on all measurements to date, modulus values can be measured between $10^5$ and $10^{13}$ dyne/cm$^2$ and loss values between 0.01 and 10. The resonance apparatus can measure 2 to 3 orders of magnitude higher in modulus and 1 order of magnitude lower in loss factor than the progressive wave technique. Also, this apparatus can characterize different kinds of materials, not limited just to viscoelastic materials. Finally, this apparatus is easy to operate. Thus, in comparison to the progressive wave technique, a complete master curve is obtained in half the time, approximately 1.5 h.

There has been disclosed apparatus providing a rapid method of obtaining Young's modulus and loss factor of materials. The apparatus and method is capable of characterizing a number of viscoelastic materials: filled and unfilled silicone rubbers, foamed and solid polyurethane rubbers, nitrile rubbers, and natural rubbers. In addition, the characterization of metals and metal composites can be made.

While the apparatus for and method of measuring the characteristics of a material have been disclosed herein, it will be obvious that various changes and modifications may occur to those skilled in the art without departing from the spirit of the invention which is meant to be limited only by the scope of the claims annexed hereto.

What is claimed is:

1. A method of measuring acoustic properties of a material comprising:
    selecting an elongate sample of the material having a length considerably greater than its lateral dimensions;
    securing accelerometers at opposite ends of the elongate sample for measuring longitudinal displacements thereof;
    driving one end of the elongate sample with random noise while allowing the other end to move freely for establishing resonant standing waves longitudinally thereof between its ends;

measuring the amplitude and phase difference of acceleration ratio near resonant peaks for the elongate sample when the ends are approximately 90° out of phase with each other which provides values for Q, wherein $Q = 20 \log(a_2/a_1)$, and frequency (f) for each resonant peak;

applying the values of Q to the formula $$\sinh(\xi \tan \theta/2)(\sin \xi + R\xi \cos \xi) + R\xi \tan \theta/2 \sin \xi \cosh(\xi \tan \theta/2) = 1/Q$$

and solving it simultaneously with the formula $$\cosh(\xi \tan \theta/2)(\cos \xi - R\xi \sin \xi) + R\xi \tan \theta/2 \cos \xi \sinh(\xi \tan \theta/2) = 0$$

for $\xi$ and $\tan \theta/2$, wherein $\xi$ is related to the speed of sound propagating through the sample, $\theta$ is the phase lag between stress and strain, and R is the mass ratio;

calculating the speed of sound (c) propagating through the material according to the formula $$c = 2\pi f L/\xi,$$

wherein L is the length of the elongate sample of material;

calculating Young's modulus (E') for the material from the formula $$E' = \rho c^2 \cos^2(\theta/2) \cos \theta,$$

wherein $\rho$ is the mass density of the material; and calculating the loss factor ($\delta$) of the material from the formula $$\delta = \tan \theta.$$

* * * * *